Patented Apr. 28, 1936

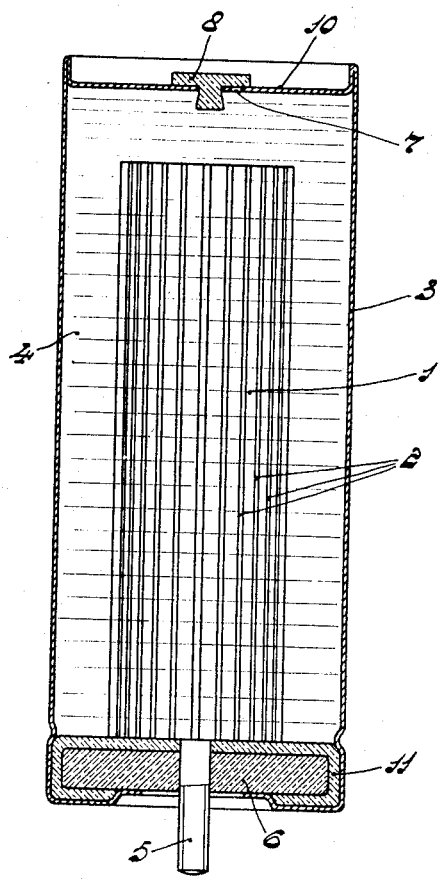

2,039,154

UNITED STATES PATENT OFFICE 2,039,154

ELECTROLYTIC CONDENSER

Hendrik Emmens, Willem Christiaan van Geel, and Anthonius Frederik Peter Johannes Claassen, Eindhoven, Netherlands, assignors to N. V. Philips Gloeilampenfabrieken, Eindhoven, Netherlands Application June 8, 1933, Serial No. 674,929
In Germany June 10, 1932

14 Claims. (Cl. 175—315)

This invention relates to electrolytic condensers and more particularly to the electrolytes used in such condensers.

The capacity effect obtained in such devices is due to the properties of the electrolytically formed oxide film of the filmed electrode or electrodes, when immersed in a suitable electrolyte, and the proper functioning of the condenser depends on the intactness of this oxide film.

While various electrolytes have been suggested for the condensers, both acidic and alkaline, it has been found that the best results are obtained when the electrolyte is substantially neutral, as even weak acids or alkalies are liable to attack the electrodes and their film, especially during periods of idleness of the condenser.

In present-day condensers, as a rule, as electrolyte is used which is a solution of a weak acid and of alkali salts or ammonia salts, and especially good results are obtained with an electrolyte as described in the co-pending application Ser. No. 594,982 filed February 25, 1932, in which the electrolyte comprises primary potassium phosphate and secondary potassium phosphate in such proportion as to make the solution substantially neutral.

While, as pointed out in said application, even weak acids attack the film and the neutralizing of the acid electrolyte has been found highly advantageous, we have found the quite surprising fact that by rendering the electrolyte comparatively highly acidic very important improvements can be obtained.

According to the invention an acid, for instance, citric acid, is added to the electrolyte which preferably comprises at least one primary or secondary phosphate, so as to give the electrolyte a pH falling between the values of 2 to 4.

As it is well known, the pH value of a solution is the negative logarithm of the figure which gives the H-ion concentration in the solution.

Thereby pH=7 represents a neutral solution, corresponding to the concentration of $10^{-7}$ gramatoms of H-ions per liter. Pure distilled water can be generally regarded as such a neutral solution.

Alkaline solutions have pH values above 7, while acidic solutions have pH values below 7, and the greater the acidity the smaller the pH value, and the greater the alkalinity the greater the pH value.

According to the invention, by the addition of a comparatively strong acid, for instance, of citric acid, to an electrolyte comprising a solution of a phosphate, the electrolyte is given a relatively high acidity. Preferably the acidity of such electrolyte should fall between the pH values of 2 to 4. If the acidity of the electrolyte is either materially lower or higher, the filmed electrode is attacked by the electrolyte and the condenser gradually deteriorates. On the other hand, if the pH value of the electrolyte falls between 2 and 4, and is preferably about 3.5 to 3.7, the acid exerts a very favorable stabilizing effect on the film and the film shows great permanency. The electrolyte comprises preferably at least one of the primary and secondary phosphates, for instance, primary or secondary potassium phosphate, a comparatively strong acid, for instance, citric acid, an alkaline, for instance, a carbonate, and one or more ionizing solvents, for instance, a polyhydrous alcohol, as glycerine, and water.

Other polyhydrous alcohols, for instance glycol, may be used.

The invention will be more clearly understood by reference to the accompanying drawing which represents by way of example an embodiment thereof.

The single figure is a diagrammatic side view, partly in section, of an electrolytic condenser embodying our invention.

The electrode 1 of the condenser consists of a film-forming metal, preferably of aluminium containing less than .05% of copper, which material, as described in the co-pending application of van Arkel, Emmens and van Geel, Ser. No. 659,204, filed March 1, 1933, can be subjected to a chemical roughening process by means of which its effective surface may be increased several fold.

The electrode may be of any suitable construction, as shown it consists of a cylindrical body provided with ribs 2 and carried by an extension 5. The electrode 1 is suitably provided with an electrolytically formed aluminium-oxide film. The container 3 of the condenser may be of non-filming or film-forming metal, for instance, of aluminium.

Instead of aluminium titanium, zirconium or tantalum may be used.

The electrolyte 4 fills up the container close to its top.

The container is provided with a reentrant cap 10 which may be integral with the container or may be a separate part suitably secured thereto.

The cap 10 carries a rubber flap valve 8 of the general construction described in the co-pending application of H. W. Boessenkool, Ser. No. 658,206, filed February 23, 1933, the flap of which covers an aperture 7 through which the gases which are liberated in the condenser during operation may escape when their pressure has built up to a sufficiently large value to lift the flap of the valve 8.

On the lower end of the condenser a suitable cover 6 of insulating material, for instance, artificial resin, is provided which is surrounded by a gasket washer 11, the lower end of the container 3 being crimped over said washer so as to obtain a liquid—and air-tight seal.

The electrolyte 4, according to the invention, consists of a solution which is substantially neutral or slightly acidic or alkaline, and to which is added a comparatively strong acid, so that the resultant acidity of the electrolyte gives a pH value of between 2 to 4.

A suitable electrolyte, for instance, is one which comprises 40 gms. of primary potassium phosphate ($KH_2PO_4$), 40 gms. of citric acid, 17 ccm. of ammonium hydroxide ($NH_4OH$), 6 norm., one liter of glycerine and about 10% of water. The specific resistance of such a solution is about 5000 ohms.

As the alkaline constituent, instead of ammonia, sodium bicarbonate $NaHCO_3$ or sodium carbonate $Na_2CO_3$, may be used, and preferably the amount of alkaline constituent added should be such that in each case an acidity of about pH 3.5 should be obtained.

Another suitable electrolyte consists of 40 gms. of secondary sodium phosphate ($Na_2HPO_4$), 40 gms. of citric acid, one liter of glycerine, 10% to 12% of water, in which case the acidity is about 3.7.

Instead of citric acid other acids as for instance phosphoric acid or tartaric acid may be used.

Though the best results have been obtained with alcohol as a solvent, the invention is also applicable to aqueous solutions.

While it has been already known to give the electrolyte used for electrolytic condensers a slight acidity, the prime purpose of such acidulation was to prevent the electrolyte of turning alkaline during operation and such acidulated electrolytes had pH values of 5.5 to 6.5,—thus the electrolyte was but slightly acidic.

While we have described our invention in connection with specific examples, we do not wish to be limited to same, but desire the appended claims to be construed as broadly as permissible in view of the prior art.

What we claim is:

1. An electrolytic condenser comprising a film-forming electrode and an electrolyte comprising a solution of a phosphate and of an acid, said electrolyte having a pH value of 2 to 4.

2. An electrolytic condenser comprising a film-forming electrode and an electrolyte, said electrolyte comprising an alcoholic solution of a phosphate and of an acid, and having a pH value of 2 to 4.

3. An electrolytic condenser comprising a film-forming electrode and an electrolyte comprising an alcoholic solution of at least one of the primary and secondary phosphates and citric acid.

4. An electrolyte for electrolytic condensers, comprising at least one of the primary and secondary phosphates, and an acid, said electrolyte having a pH value of 2 to 4.

5. An electrolyte for electrolytic condensers, comprising an alcoholic solution of at least one of the primary and secondary potassium phosphates, and citric acid, said electrolyte having a pH value of 2 to 4.

6. An electrolytic condenser comprising a film-forming electrode and an electrolyte comprising a glycerine solution of at least one of the primary and secondary phosphates, and an acid, said solution having a pH value of 2 to 4.

7. An electrolyte for electrolytic condensers, comprising an alcoholic solution of at least one of the primary and secondary phosphates and an acid, said electrolyte having a pH value of 2 to 4.

8. An electrolyte for electrolytic condensers, comprising at least one of the primary and secondary phosphates, an acid and an alkali, said electrolyte having a pH value of 3.5.

9. An electrolytic condenser comprising a film-forming electrode, and an electrolyte comprising a phosphate, an acid and a carbonate, said solution having a pH of approximately 3.5.

10. An electrolytic condenser having a film-forming electrode and an electrolyte comprising a solution of one of the primary and secondary phosphates, citric acid, ammonium hydroxide glycerine and water, said electrolyte having a pH value of 2 to 4.

11. An electrolytic condenser comprising a film-forming electrode and an electrolyte comprising a glycerine solution of primary potassium phosphate, citric acid and ammonia, said electrolyte having a pH value of 2 to 4.

12. An electrolytic condenser comprising a film-forming electrode and an electrolyte comprising a glycerine solution of primary potassium phosphate, citric acid and a carbonate, said electrolyte having a pH value of 2 to 4.

13. An electrolytic condenser comprising a film-forming electrode and an electrolyte comprising an alcoholic solution of one of the primary and secondary phosphates of an alkali metal and citric acid, said electrolyte having a pH value of 2 to 4.

14. An acidic electrolyte for electrolytic condensers comprising a phosphate and a sufficient amount of acid to impart to the electrolyte a pH value of 2 to 4.

HENDRIK EMMENS.
WILLEM CHRISTIAAN van GEEL.
ANTHONIUS FREDERIK PETER
JOHANNES CLAASSEN.